Dec. 26, 1939.  N. EDDY  2,185,024
EXTENSION FOR GEAR-SHIFT LEVERS
Filed Sept. 20, 1938

INVENTOR.
NELSON EDDY
BY James M. Abbett
ATTORNEYS.

Patented Dec. 26, 1939

2,185,024

UNITED STATES PATENT OFFICE 2,185,024

EXTENSION FOR GEAR-SHIFT LEVERS

Nelson Eddy, Beverly Hills, Calif.

Application September 20, 1938, Serial No. 230,792

2 Claims. (Cl. 74—543)

This invention relates to an automobile accessory and particularly pertains to an extension for gear-shift levers.

At the present time certain makes of automobiles are equipped with a gear-shifting mechanism which makes it possible for the ordinary gear-shift lever to be eliminated, and allows the gear-shift lever to be installed upon the steering column of the automobile at a point conveniently disposed beneath the steering wheel. In this particular type of construction the gear-shift lever extends horizontally and substantially radially at the right-hand side of the steering column and may be manipulated by the right hand of the operator. Due to the design of this particular arrangement it is necessary for the lever to be moved to various shifting positions, certain of said movements being effected by asserting a pushing force upon the shifting lever, and other movements being brought about by asserting a pull upon the shifting lever. The mechanism is such that it requires less effort to pull the lever in a shifting operation than to push it to a desired position. This being the case it will be evident that persons who do not have much strength in their arm or who are left-handed would have some difficulty in quickly shifting the gears through the medium of the mechanism here disclosed.

It is the principal object of the present invention, therefore, to provide an attachment for gear-shift levers of the type herein disclosed and described and by which the operation of shifting the gears will be facilitated, and means will be provided whereby the gears may be shifted from either side of the steering column and by the use of either the right or left hand of the driver.

The present invention contemplates the provision of a lever attachment adapted to be secured to the usual gear-shifting lever carried by the steering column of an automobile and which lever attachment is supported in a manner to extend radially from the diametrically opposite side of the steering column from that occupied by the normally installed gear-shift lever, and whereby the gears may be shifted with equal ease by either of the levers.

The invention is illustrated by way of example in the accompanying drawing, in which.

Figure 1:
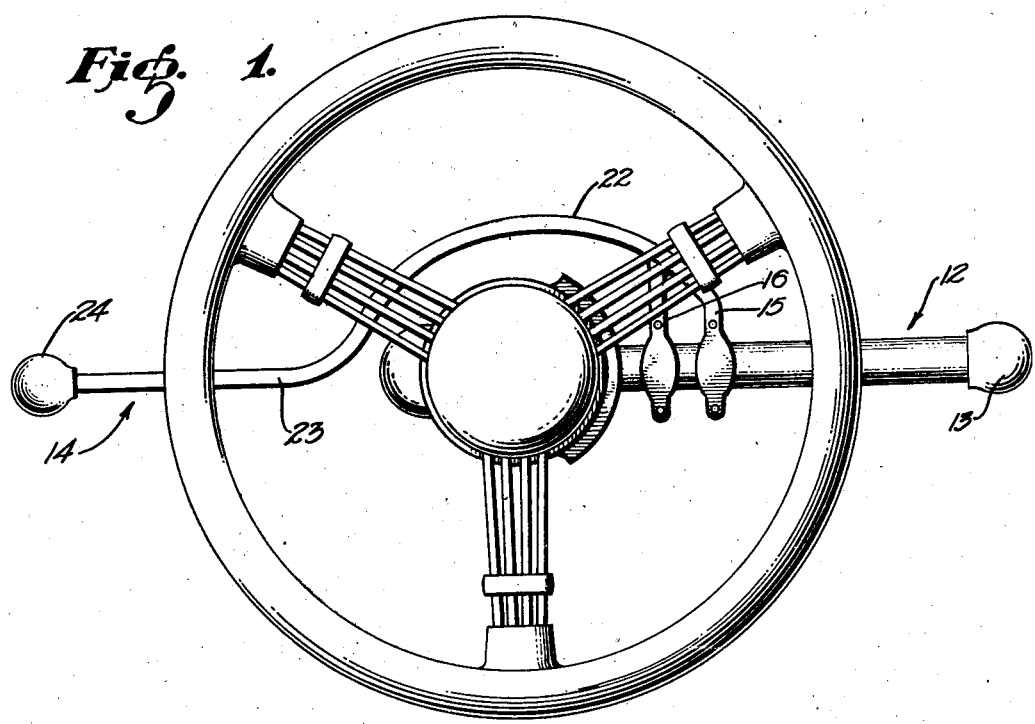
Figure 1 is a view in plan showing a steering wheel of an automobile and the steering column equipped with the usual gear-shifting mechanism with which the present invention is concerned, the view further showing the attachment lever.
Figure 2:
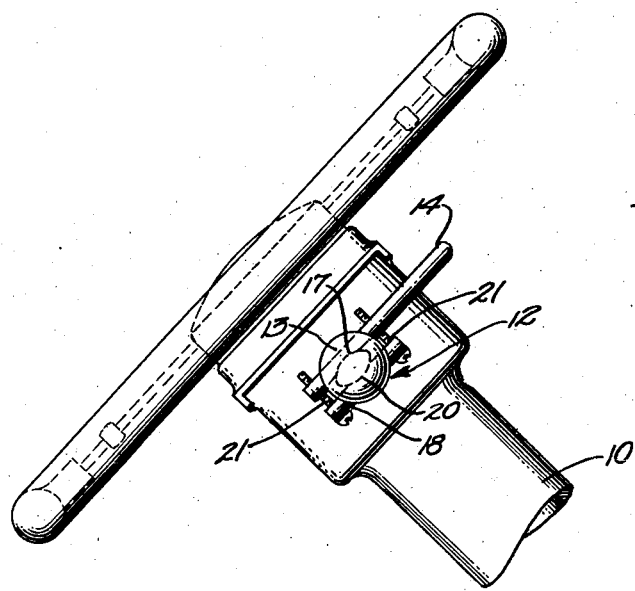
Fig. 2 is a fragmentary view in side elevation showing a portion of an automobile steering column carrying a steering wheel and further indicating the position of the auxiliary lever attached to the main gear-shift lever.

Referring more particularly to the drawing, 10 indicates a steering column of a vehicle, at the upper end of which is disposed the housing of a suitable gear-shift mechanism. This gear-shift mechanism is actuated and controlled by a lever 12 which extends horizontally from the structure and which may be manipulated to control the shifting of the gears of the automobile to and through the usual positions. As will be seen by reference to Fig. 1 of the drawing the gear-shift lever 12 extends substantially radially with relation to the longitudinal axis of the steering column 10 and is fitted with a suitable type of knob 13 at its outer end.

Mounted upon the lever 12 is an extension lever 14. This lever is here shown as formed with a pair of clamping arms 15 and 16 which are spaced from each other and extend transversely of the lever 12. These arms are preferably formed with arcuate recesses 17 in their faces so that they will conform to the circular contour of the lever 12 and will be braced thereagainst. Each of the extensions 15 and 16 is fitted with a clamping element 18, which are likewise formed with arcuate recesses, here indicated at 20, to seat against the opposite side of the lever arm 12. Fastening screws 21 pass through the elements 18 and into threaded openings in the members 15 and 16, whereby the lever extension structure will be rigidly fastened upon the gear-shifting lever 12.

The clamping arms 15 and 16 extend laterally from an arcuate portion 22 of the extension lever 14. This arcuate portion lies in a plane substantially at right angles to the central longitudinal axis of the steering column and extends in an encircling position around the gear-shift lever housing. For convenience it is preferable that the direction of this extension be upon the opposite side of the steering column from the driver.

The arcuate portion 22 of the auxiliary lever structure 14 terminates in a straight lever section 23 which is supported radially of the central axis of the steering column and preferably in central longitudinal alignment with the gear-shift lever 12, it being on the diametrically opposite side of the steering column from the gear-shift lever 12. The lever portion 23 is preferably fitted with a knob 24 similar to that indicated at 13 on the lever 12.

It will be understood that the radial adjustment of the lever extension 14 may be made as desired and that the length of the element 23 of the extension lever 14 may be such as to make it possible for a greater or shorter lever arm to be created by the extension lever as may be required for convenient operation.

In operation of the present invention the lever extension may be made as here desired or may be varied in design, configuration and in the specific type of fastening means, as requirements of convenience and symmetry may dictate. After the structure has been fastened onto the gear-shift lever 12 it will be evident that the gears may be shifted by either hand with equal convenience, and that when the driver has difficulty in shifting the gear to a particular position by the motion of one lever he may shift it by a countermotion of the opposite lever or by the combined application of counterforce on both levers under extreme conditions.

It will thus be seen that the structure here disclosed provides a simple and convenient attachment for the type of automobile gear-shift levers which are mounted upon the steering column, and which attachment makes it possible for the shifting of the gear-shift lever to be made by either hand and from either side of the column, the structure being easy to install and convenient to operate.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. In combination with an automobile steering column which includes a steering wheel, gear-shift mechanism and a gear-shift lever extending radially from the column in a plane at right angles to the axis thereof and beneath the steering wheel, said gear-shift lever being mounted to swing circumferentially with relation to its axis and in a plane intersecting the axis of the column to different gear shifting positions, an auxiliary gear-shift lever having an arcuate portion lying in the transverse plane of the main gear-shift lever and partially encircling the steering column, one end of said arcuate portion being bifurcated, the arms of said portion carrying separate clamp means to embrace the main gear-shift lever and to secure the structure rigidly therewith, and a straight handle portion formed at the opposite end of the arcuate portion of the gear-shift lever and extending radially with relation to the axis of the steering column and in longitudinal alignment with the main gear-shift lever whereby manipulation of said auxiliary gear shift lever at one side of the steering column will actuate the main gear-shift lever on the opposite side of the steering column.

2. In combination with an automobile steering column which includes a steering wheel, gear-shift mechanism and a gear-shift lever extending radially from the column in a plane at right angles to the axis thereof and beneath the steering wheel, said gear-shift lever being mounted to swing circumferentially with relation to its axis and in a plane intersecting the axis of the column to different gear shifting positions, an auxiliary gear-shift lever having an arcuate portion lying in the transverse plane of the main gear-shift lever and partially encircling the steering column, clamping means carried by one end of said arcuate portion to embrace the main gear-shift lever and to secure the structure rigidly therewith, and a straight handle portion formed at the opposite end of the arcuate portion of the gear-shift lever and extending radially with relation to the axis of the steering column and in longitudinal alignment with the main gear-shift lever whereby manipulation of said auxiliary gear-shift lever at one side of the steering column will actuate the main gear-shift lever on the opposite side of the steering column.

NELSON EDDY.